(12) United States Patent
Veldkamp et al.

(10) Patent No.: US 12,360,401 B2
(45) Date of Patent: Jul. 15, 2025

(54) PHOTOCHROMIC FILM LAMINATE

(71) Applicant: TRANSITIONS OPTICAL, LTD., Tuam (IE)

(72) Inventors: Brad S. Veldkamp, Allison Park, PA (US); Ramaiahgari Reddy, Murrysville, PA (US); Anil Kumar, Murrysville, PA (US); David J. Park, Tuam (IE); Brian Smyth, Tuam (IE)

(73) Assignee: Transitions Optical, Ltd., Tuam (IE)

( * ) Notice: Subject to any disclaimer, the term of this patent is extended or adjusted under 35 U.S.C. 154(b) by 696 days.

(21) Appl. No.: 17/639,042

(22) PCT Filed: Aug. 30, 2019

(86) PCT No.: PCT/EP2019/073178
§ 371 (c)(1),
(2) Date: Feb. 28, 2022

(87) PCT Pub. No.: WO2021/037375
PCT Pub. Date: Mar. 4, 2021

(65) Prior Publication Data
US 2022/0326548 A1 Oct. 13, 2022

(51) Int. Cl.
*C09J 7/29* (2018.01)
*C09J 7/38* (2018.01)
(Continued)

(52) U.S. Cl.
CPC .............. *G02C 7/102* (2013.01); *C09J 7/29* (2018.01); *C09J 7/385* (2018.01); *C09J 11/06* (2013.01);
(Continued)

(58) Field of Classification Search
None
See application file for complete search history.

(56) References Cited

U.S. PATENT DOCUMENTS

| 2,941,988 A | 6/1960 | Wolf |
| 3,361,706 A | 1/1968 | Meriwether |

(Continued)

FOREIGN PATENT DOCUMENTS

| CN | 101600776 A | 12/2009 |
| EP | 0304817 A1 | 3/1989 |

(Continued)

OTHER PUBLICATIONS

Brown, "vol. III: Photochromism", Techniques in Chemistry, 1971, pp. 789-792, John Wiley and Sons, Inc., New York.
(Continued)

*Primary Examiner* — Anish P Desai
(74) *Attorney, Agent, or Firm* — The Webb Law Firm

(57) ABSTRACT

Provided is a photochromic film laminate including (a) a first polymeric film layer having a first surface and an opposing second surface; and (b) an adhesive layer over at least a portion of and in direct contact with the first surface of the first polymeric film layer (a). The adhesive layer is formed from a composition of a thermoplastic polyol having a number average molecular weight greater than or equal to 30,000 g/mol; a poly(anhydride); and a photochromic material. The thermoplastic polyol (i) is present in the composition in an amount greater than or equal to 60 percent by weight based on total combined weight of solids present in the thermoplastic polyol (i) and the poly(anhydride) (ii). Also provided is an optical article prepared with the photochromic film laminate.

20 Claims, 1 Drawing Sheet

(51) Int. Cl.
*C09J 11/06* (2006.01)
*G02B 1/04* (2006.01)
*G02C 7/10* (2006.01)

(52) U.S. Cl.
CPC .......... *G02B 1/04* (2013.01); *C09J 2203/326* (2013.01); *C09J 2301/408* (2020.08); *C09J 2301/414* (2020.08); *C09J 2433/00* (2013.01); *C09J 2469/006* (2013.01); *C09J 2475/00* (2013.01); *Y10T 428/2896* (2015.01)

(56) References Cited

U.S. PATENT DOCUMENTS

| | | |
|---|---|---|
| 3,862,989 A | 1/1975 | Hansen |
| 3,896,251 A | 7/1975 | Landucci |
| 4,798,745 A | 1/1989 | Martz et al. |
| 4,931,220 A | 6/1990 | Haynes et al. |
| 5,143,997 A | 9/1992 | Endo et al. |
| 5,166,345 A | 11/1992 | Akashi et al. |
| 5,236,958 A | 8/1993 | Miyashita |
| 5,239,012 A | 8/1993 | McEntire et al. |
| 5,252,742 A | 10/1993 | Miyashita |
| 5,256,452 A | 10/1993 | McMonigal et al. |
| 5,359,085 A | 10/1994 | Iwamoto et al. |
| 5,488,119 A | 1/1996 | Fischer-Reimann et al. |
| 5,527,879 A | 6/1996 | Nakae et al. |
| 5,645,767 A | 7/1997 | Van Gemert |
| 5,658,501 A | 8/1997 | Kumar et al. |
| 5,821,287 A | 10/1998 | Hu et al. |
| 6,113,814 A | 9/2000 | Gemert et al. |
| 6,153,126 A | 11/2000 | Kumar |
| 6,296,785 B1 | 10/2001 | Nelson et al. |
| 6,313,254 B1 | 11/2001 | Meijs et al. |
| 6,348,604 B1 | 2/2002 | Nelson et al. |
| 6,353,102 B1 | 3/2002 | Kumar |
| 6,420,452 B1 | 7/2002 | Gunatillake et al. |
| 6,436,525 B1 | 8/2002 | Welch et al. |
| 6,555,028 B2 | 4/2003 | Walters et al. |
| 6,733,887 B2 | 5/2004 | Okoroafor et al. |
| 6,963,003 B2 | 11/2005 | Qin |
| 7,465,415 B2 | 12/2008 | Wang et al. |
| 7,666,510 B2 | 2/2010 | Stewart |
| 8,242,189 B2 | 8/2012 | Rega |
| 9,957,394 B2 | 5/2018 | Zhou et al. |
| 2003/0143404 A1 | 7/2003 | Welch et al. |
| 2004/0125337 A1 | 7/2004 | Boulineau et al. |
| 2004/0126587 A1 | 7/2004 | Maki et al. |
| 2005/0127336 A1 | 6/2005 | Kim et al. |
| 2006/0093844 A1 | 5/2006 | Conklin et al. |
| 2007/0122626 A1 | 5/2007 | Qin et al. |
| 2008/0187749 A1* | 8/2008 | Cael .......... G02B 5/23 428/354 |
| 2013/0126077 A1 | 5/2013 | Qin et al. |
| 2014/0340727 A1* | 11/2014 | Mori .......... C08G 18/282 252/586 |
| 2019/0185700 A1 | 6/2019 | Shaffer et al. |

FOREIGN PATENT DOCUMENTS

| | | |
|---|---|---|
| EP | 1149138 B1 | 3/2005 |
| EP | 2578589 A1 | 4/2013 |
| JP | S54118778 A | 9/1979 |
| JP | 2002531680 A | 9/2002 |
| JP | 2012230317 A | 11/2012 |
| JP | 2012242701 A | 12/2012 |
| JP | 2012242718 A | 12/2012 |
| KR | 1020050042023 A | 5/2005 |
| NO | 0170719 A2 | 9/2001 |
| WO | 9705213 A1 | 2/1997 |
| WO | 0034410 A1 | 6/2000 |
| WO | 00344410 A1 | 6/2000 |

OTHER PUBLICATIONS

Wagner et al., "α,ω-Diisocyanatocarbodiimides, -Polycarbodiimides, and Their Derivatives", Angew. Chem. Int. Ed. Engl., Oct. 1981, pp. 819-830, vol. 20:10.

* cited by examiner

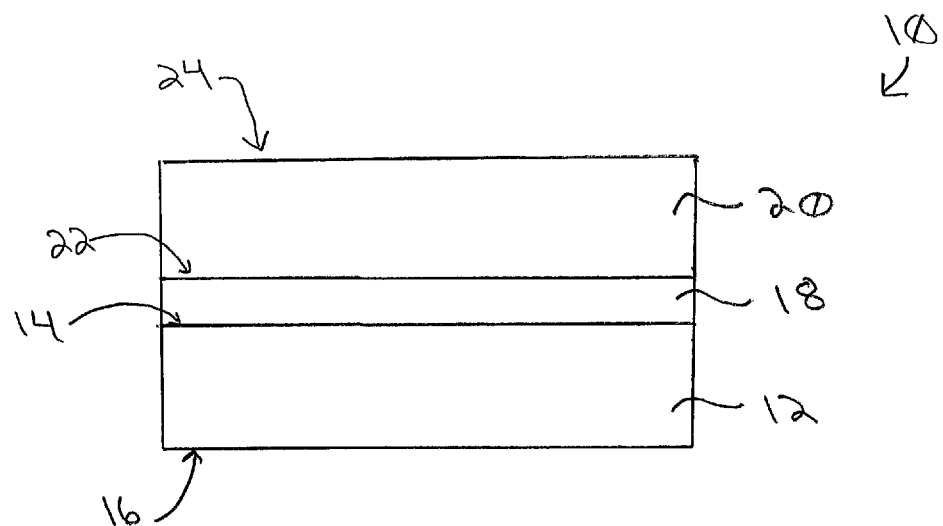

PHOTOCHROMIC FILM LAMINATE

CROSS REFERENCE TO RELATED APPLICATIONS

This application is the United States national phase of International Application No. PCT/EP2019/073178 filed Aug. 30, 2019, the disclosure of which is hereby incorporated by reference in its entirety.

FIELD

The present invention provides a photochromic film laminate including a polymeric film layer and a photochromic adhesive layer over the polymeric film layer. The photochromic film laminate is especially suitable as a component in an optical article.

BACKGROUND

Photochromic articles have been the focus of much research and development. In particular, plastic photochromic transparencies are of interest due to their many potential uses including, for example, prescription lenses, non-prescription lenses, sports goggles, face shields, visors, and windows. For ophthalmic photochromic lenses, plastic materials are preferred due to their light weight and impact resistance.

Plastic photochromic ophthalmic lenses can be prepared by a variety of methods. One approach involves mixing photochromic dyes into the bulk lens material before polymerization of the lens material within a mold. This method is referred to as an "in-mass" incorporation of the photochromic dyes. However, many typical plastic lens materials such as allyl diglycol carbonate do not provide a matrix that enables photochromic dyes to quickly transition from a first colorless state to a second colored state upon exposure to actinic radiation; and then rapidly revert to the first colorless state from the second colored state in the absence of actinic radiation. Another problem associated with the in-mass method is that the variation in the thickness of a lens can result in uneven darkness in the second colored state.

Another approach is imbibition or diffusion of the photochromic dyes into the surface of the plastic lens. This technique can result in a more uniform darkness or coloration of the lens in the second colored state. However, such imbibed lenses also can exhibit a slow transition from the second colored state to the first colorless state in the absence of actinic radiation.

A third approach, involving the application of a photochromic curable coating to the surface of the lens can provide for even darkness as well as fast transitions between the first and second states. However, these coatings, which generally have a thickness of 20 microns or more to provide a sufficient amount of photochromic material for acceptable performance, are not well suited for application to segmented or multifocal lenses due to uneven coating thickness in the area of the segment line. The generally soft coatings must also be protected from damage and scratching thereby requiring application of additional harder coating layers.

For plastic lenses made via the injection molding of thermoplastics, such as Bisphenol A-based polycarbonates, insert injection molding is another way to incorporate photochromic materials. In this method, a photochromic laminate insert is placed into a mold before the molten thermoplastic is injected. The filled mold is compressed and the photochromic laminate is fused to the molten thermoplastic material, thereby forming a photochromic lens. The insert injection molding method provides lenses with even color in the activated state and allows for fast transitions between the first and second states. Further, this method is quite suitable for the manufacture of photochromic segmented lenses. Compared to the photochromic coating approach described above, the insert injection molding method also allows for incorporation of a thicker photochromic layer within a molded optical article such as a lens.

Known in the art are photochromic laminates made from a photochromic thermoplastic polyurethane adhesive bonded between transparent polymeric sheets. One limitation of these laminates is that during insert injection molding the adhesive can flow out past the edges of the transparent polymeric sheets. This is often referred to as "bleeding" of the adhesive. Bleeding can result in contamination of the molds and defects around the edges of the lenses.

Also known in the art are photochromic laminates employing a photochromic adhesive comprising a thermoplastic polyurethane and an isocyanate prepolymer. Such laminates are intended to overcome the problem of bleeding by at least partially crosslinking the polyurethane adhesive layer, though processing problems still can occur. Moreover, isocyanate materials are less desirable due to the special handling required for safety measures. Further, the compositions containing isocyanate materials generally have a short pot life.

Therefore, a need exists to overcome the shortcomings and problems associated with the art-recognized photochromic polyurethane laminates, especially those used for insert injection molding to make photochromic lenses.

SUMMARY

The present invention is directed to a photochromic film laminate comprising at least:
(a) a first polymeric film layer having a first surface and an opposing second surface; and
(b) an adhesive layer over at least a portion of and in direct contact with the first surface of the first polymeric film layer (a), said adhesive layer formed from an adhesive composition comprising:
  (i) a thermoplastic polyol having a number average molecular weight greater than or equal to 30,000 g/mol;
  (ii) a poly(anhydride); and
  (iii) a photochromic material,
wherein the thermoplastic polyol (i) is present in the composition in an amount greater than or equal to 60 percent by weight based on total combined weight of solids present in the thermoplastic polyol (i) and the poly(anhydride) (ii).

The invention also provides an optical article comprising the photochromic film laminate.

BRIEF DESCRIPTION OF THE DRAWING

FIG. 1 is a side, sectional view of an example of a photochromic film laminate incorporating features of the invention.

DETAILED DESCRIPTION

As used herein, the articles "a", "an", and "the" include plural referents unless otherwise expressly and unequivocally limited to one referent.

As used herein, the term "includes" is synonymous with "comprises".

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to 1 to 6.1, or 3.5 to 7.8, or 5.5 to 10.

As used herein, unless otherwise indicated, left-to-right representations of linking groups, such as divalent linking groups, are inclusive of other appropriate orientations, such as, but not limited to, right-to-left orientations. For purposes of non-limiting illustration, the left-to-right representation of the divalent linking group

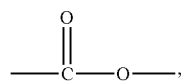

or equivalently —C(O)O—, is inclusive of the right-to-left representation thereof,

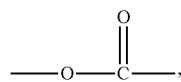

or equivalently —O(O)C— or —OC(O)—.

Other than in the operating examples, or where otherwise indicated, all numbers expressing quantities of ingredients, reaction conditions, and so forth used in the specification and claims are to be understood as modified in all instances by the term "about". By "about" is meant plus or minus twenty-five percent of the stated value, such as plus or minus ten percent of the stated value. However, this should not be considered as limiting to any analysis of the values under the doctrine of equivalents.

As used herein, molecular weight values of polymers, such as weight average molecular weights (Mw) and number average molecular weights (Mn), are determined by gel permeation chromatography using appropriate standards, such as polystyrene standards, unless specifically indicated otherwise.

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester", means derivatives of acrylic acid and methacrylic acid, inclusive of acrylate esters, methacrylate esters, acrylamides, methacrylamides, acrylic acid and methacrylic acid. As used herein, the term "(meth)acrylic acid" means methacrylic acid and/or acrylic acid.

The photochromic compounds of the present invention can, with some embodiments, also be referred to herein as photochromic-dichroic compounds (such as, when they include one or more mesogen-containing groups).

As used herein, the term "thermoplastic" refers to a polymer which softens or becomes fluid upon heating and solidifies upon cooling, and is capable of reprocessing, i.e., undergoing such heating and cooling, without losing structural integrity.

As used herein, the term "photochromic" and similar terms, such as "photochromic compound", means having an absorption spectrum for at least visible radiation that varies in response to absorption of at least actinic radiation. Further, as used herein, the term "photochromic material" means any substance that is adapted to display photochromic properties (such as, adapted to have an absorption spectrum for at least visible radiation that varies in response to absorption of at least actinic radiation) and which includes at least one photochromic compound.

As used herein, the term "actinic radiation" means electromagnetic radiation that is capable of causing a response in a material, such as, but not limited to, transforming a photochromic material from one form or state to another as will be discussed in further detail herein.

As used herein, the term "dichroic" means capable of absorbing one of two orthogonal plane polarized components of at least transmitted radiation more strongly than the other.

As used herein, the term "photochromic-dichroic" and similar terms, such as "photochromic-dichroic compound", means possessing and/or providing both photochromic properties (i.e., having an absorption spectrum for at least visible radiation that varies in response to at least actinic radiation), and dichroic properties (i.e., capable of absorbing one of two orthogonal plane polarized components of at least transmitted radiation more strongly than the other).

As used herein, and unless stated otherwise or otherwise limited, the term "photochromic material" includes thermally reversible photochromic materials and compounds and non-thermally reversible photochromic materials and compounds. The term "thermally reversible photochromic compounds/materials" as used herein means compounds/materials capable of converting from a first state, for example a "clear state", to a second state, for example a "colored state", in response to actinic radiation, and reverting back to the first state in response to thermal energy. The term "non-thermally reversible photochromic compounds/materials" as used herein means compounds/materials capable of converting from a first state, for example a "clear state", to a second state, for example a "colored state", in response to actinic radiation, and reverting back to the first state in response to actinic radiation of substantially the same wavelength(s) as the absorption(s) of the colored state.

As used herein, to modify the term "state", the terms "first" and "second" are not intended to refer to any particular order or chronology, but instead refer to two different conditions or properties. For purposes of non-limiting illustration, the first state and the second state of a photochromic compound can differ with respect to at least one optical property, such as but not limited to the absorption of visible and/or UV radiation. Thus, according to various non-limiting embodiments disclosed herein, the photochromic compounds of the present invention can have a different absorption spectrum in each of the first and second state. For example, while not limiting herein, a photochromic compound of the present invention can be clear in the first state and colored in the second state. Alternatively, a photochromic compound of the present invention can have a first color in the first state and a second color in the second state.

As used herein, the term "optical" means pertaining to or associated with light and/or vision. For example, according to various non-limiting embodiments disclosed herein, the optical article or element or device can be chosen from ophthalmic articles, elements and devices; display articles, elements and devices; windows; mirrors; or active and passive liquid crystal cell articles, elements and devices.

As used herein, the term "ophthalmic" means pertaining to or associated with the eye and vision. Non-limiting examples of ophthalmic articles or elements include corrective and non-corrective lenses, including single vision or multi-vision lenses, which can be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

As used herein, the term "display" means the visible or machine-readable representation of information in words, numbers, symbols, designs or drawings. Non-limiting examples of display elements include screens, monitors, and security elements, such as security marks.

As used herein, the term "window" means an aperture adapted to permit the transmission of radiation therethrough. Non-limiting examples of windows include automotive and aircraft transparencies, windshields, filters, shutters, and optical switches.

As used herein, the term "mirror" means a surface that specularly reflects a large fraction of incident light.

As used herein, the term "liquid crystal cell" refers to a structure containing a liquid crystal material that is capable of being ordered. A non-limiting example of a liquid crystal cell element is a liquid crystal display.

As used herein, the terms "over", "formed over", "deposited over", "provided over", "applied over", "residing over", or "positioned over" mean formed, deposited, provided, applied, residing, or positioned on but not necessarily in direct (or abutting) contact with the underlying element, or surface of the underlying element unless otherwise so stated. For example, a layer "positioned over" a substrate does not preclude the presence of one or more other layers, coatings, or films of the same or different composition located between the positioned or formed layer and the substrate.

All documents or portions of documents, such as but not limited to issued patents and patent applications, referred to herein, and unless otherwise indicated, are to be considered to be "incorporated by reference" in their entirety.

As used herein, "at least one of" is synonymous with "one or more of", whether the elements are listed conjunctively or disjunctively. For example, the phrases "at least one of A, B, and C" and "at least one of A, B, or C" each mean any one of A, B, or C, or any combination of any two or more of A, B, or C. For example, A alone; or B alone; or C alone; or A and B; or A and C; or B and C; or all of A, B, and C.

As used herein, "selected from" is synonymous with "chosen from", whether the elements are listed conjunctively or disjunctively. Further, the phrases "selected from A, B, and C" and "selected from A, B, or C" each mean any one of A, B, or C, or any combination of any two or more of A, B, or C. For example, A alone; or B alone; or C alone; or A and B; or A and C; or B and C; or all of A, B, and C.

The discussion of the invention may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

As used herein, open-ended terms such as "comprising" and "including" are intended to encompass closed-ended terms such as "consisting essentially of" and "consisting of". The invention comprises, consists of, or consists essentially of the following aspects of the invention, in any combination.

As previously mentioned, the present invention is directed to a photochromic film laminate. The photochromic film laminate comprises at least (a) a first polymeric film layer having a first surface and an opposing second surface; and (b) an adhesive layer formed over at least a portion of and in direct contact with the first surface of the first polymeric film layer (a). The adhesive layer is formed from an adhesive composition, such as an adhesive composition, comprising:

(i) a thermoplastic polyol having a number average molecular weight greater than or equal to 30,000 g/mol;
(ii) a poly(anhydride); and
(iii) a photochromic material.

The photochromic film laminate may further comprise (c) a second polymeric film layer, which is the same or different from the first polymeric film layer (a). The second polymeric film layer has a first surface and an opposing second surface, wherein the first surface is disposed over and in direct contact with at least a portion of the adhesive layer (b).

The polymeric film layers (a) and/or (c) each independently can comprise a polymeric film comprised of any of a wide variety of film materials, including thermoset and thermoplastic materials, such as are well known in the optical industry. For example, each of the polymeric film layers (a) and (c) can comprise a polymer selected from the group consisting of polycarbonate, polycyclic alkene, polyurethane, poly(urea)urethane, polythiourethane, polythio(urea)urethane, poly(allyl carbonate), cellulose acetate, cellulose diacetate, cellulose triacetate, cellulose acetate propionate, cellulose acetate butyrate, poly(vinyl acetate), poly(vinyl alcohol), poly(vinyl chloride), poly(vinylidene chloride), poly(ethylene terephthalate), polyester, polysulfone, polyolefin, polyether, polyamide, polyalkyl(meth)acrylate, polyvinyl butyral, polystyrene, copolymers thereof, and mixtures thereof. Especially useful are polycarbonates, such as Bisphenol A-based polycarbonates, due to their compatibility with insert injection molding techniques, their high transparency, impact resistance, and high refractive index.

The polymeric film layers (a) and/or (c) each independently may further comprise any of a wide variety of additives to influence or enhance one or more of the processing and/or performance properties of the layer. Non-limiting examples of such additives can include dyes, photoinitiators, thermal initiators, polymerization inhibitors, solvents, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, and adhesion promoters.

Also, it should be mentioned that the polymeric film layers (a) and/or (c) each independently may be comprised of a single layer (or ply) of any one of the abovementioned materials; or each of the polymeric film layers (a) and/or (c) each independently may be comprised of multiple layers of one of the abovementioned materials; or the polymeric film layers (a) and/or (c) each independently may be comprised of multiple layers of different materials such as any of those previously mentioned. The thicknesses of polymeric film layers (a) and (c) are independent of one another and can widely vary depending upon the type of material(s) comprising the polymeric film layer(s) and the desired end use thereof.

Generally, the polymeric film layers (a) and/or (c) each independently can have a thickness ranging from 25 to 2000 microns, such as from 100 to 1000 microns, or from 200 to 500 microns. The thickness of each of the polymeric film layers (a) and (c) can range between any of the above-stated values, inclusive of the stated values.

Further, it should be understood that when the polymeric film layers are used to prepare an optical element, the polymeric layers should be suitably transparent, i.e., the polymeric layers should have a percent light transmittance suitable for the end use application of the photochromic film laminate. For example, when the polymeric film layers (a) and/or (c) are used in the preparation of a lens, such as an ophthalmic lens, each of the polymeric film layer(s) can have a light transmittance of greater than 80 percent.

It should be appreciated that the first polymeric film layer (a) and/or the second polymeric film layer (c) each independently can further comprise at least one additional layer, such as any of those optical quality coatings or films as are well known in the art. For example, the first polymeric film layer (a) and/or the second polymeric film layer (c) each independently can further comprise at least one additional layer selected from the group consisting of a primer layer, a release film layer, a tie layer, a barrier layer, an adhesion-promoting layer, a UV absorbing layer, and combinations thereof.

As mentioned above, the photochromic film laminate of the present invention also comprises an adhesive layer (b) formed over at least a portion of and in direct contact with the first surface of the first polymeric film layer (a) and, likewise, over at least a portion of and in direct contact with the first surface of the second polymeric film layer (c) when the second polymeric film layer is used.

The adhesive layer (b) is formed from a composition, such as a photochromic adhesive composition, comprising (i) a thermoplastic polyol having a number average molecular weight (Mn) greater than or equal to 30,000 g/mol; (ii) a poly(anhydride); and (iii) a photochromic material.

The thermoplastic polyol (i) has a number average molecular weight (Mn) of greater than or equal to 30,000 g/mol, such as greater than 35,000 g/mol, or greater than 40,000 g/mol, or greater than 45,000 g/mol. For purposes of the present invention, the Mn of the thermoplastic polyol (i) was determined by Triple Detection Size Exclusion Chromatography (SEC-TD) using a Waters 2695 separation module with a Wyatt Technology Light Scattering detector (miniDAWN), a differential refractive index detector (OptilabrEX) and a Differential Viscometer detector (Viscostar). Tetrahydrofuran was used as the effluent at a flow rate of 1 m; min$^{-1}$, and three PL Gel Mixed C columns were used.

The thermoplastic polyol (i) can be selected from any of a number of thermoplastic polyols known in the art provided the Mn is greater than or equal to 30,000 g/mol. For example, the thermoplastic polyol (i) can comprise a thermoplastic polyol selected from the group consisting of a polyurethane polyol, a polyether polyol, a polyester polyol, a polycarbonate polyol, an acrylic polyol, a polydimethylsiloxane polyol, a poly(urea)urethane polyol, a polyamide polyol, copolymers thereof, and mixtures thereof.

For purposes of the present invention, the term "polyol" means a molecule having two or more hydroxyl groups. The thermoplastic polyol can comprise a thermoplastic polyurethane polyol, such as a thermoplastic polyurethane diol. Particularly suitable thermoplastic polyurethane polyols can include aliphatic thermoplastic polyurethane polyols, such as an aliphatic thermoplastic polyurethane diol having a Shore A hardness of less than 90 as determined by ASTM D2240.

Non-limiting examples of suitable polyurethane polyols are known and can be prepared by reaction of a polyisocyanate with excess organic polyol to form a hydroxyl functional polyurethane polymer. Examples of polyisocyanates useful in the preparation of polyurethane polyols include toluene-2,4-diisocyanate; toluene-2,6-diisocyanate; diphenylmethane-4,4'-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; lysine methyl ester diisocyanate; bis(isocyanato ethyl)fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; dicyclohexylmethane diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; polymethylene polyphenol isocyanates perhydrodiphenylmethane-2,4'-diisocyanate; perhydrodiphenylmethane-4,4,-diisocyanate and mixtures thereof. Examples of organic polyols useful in the preparation of polyurethane polyols include the other polyols described herein, e.g., polyester polyols, polyether polyols, amide-containing polyols, polyacrylic polyols, polyhydric polyvinyl alcohols and mixtures thereof. Suitable polyurethane polyols can include CARBOTHANE™ TPU, PEARLSTICK™, and TECOFLEX™ TPU from The Lubrizol Corporation; CHRONOFLEX AL®, CHRONOFLEX C®, CHRONOTHANE P™, and CHRONOSIL® available from AdvanBioSource Biomaterials (Wilmington, MA); ELAST-EON™ available from Aortech International PLC (Dundee, United Kingdom).

Non-limiting examples of suitable polyether polyols are generally known. Examples of suitable polyether polyols can include, but are not limited to, various polyoxyalkylene polyols, polyalkoxylated polyols, e.g., poly(oxytetramethylene)diols, and mixtures thereof. The polyoxyalkylene polyols can be prepared, according to well-known methods, by ring-opening alkylene oxide, or a mixture of alkylene oxides, using acid or base catalysts with a polyhydric initiator or a mixture of polyhydric initiators such as ethylene glycol, propylene glycol, glycerol, sorbitol and the like. Illustrative alkylene oxides include ethylene oxide, propylene oxide, butylene oxide, amylene oxide, aralkylene oxides, e.g., styrene oxide, and the halogenated alkylene oxides such as trichlorobutylene oxide and so forth. Particularly useful polyether polyols can include, but are not limited to, poly(tetrahydrofuran)diol, which is also known as poly (tetramethylene ether) glycol.

Polyester polyols are generally known and can be prepared by conventional techniques utilizing diols, triols and polyhydric alcohols as are well known in the art reacted with polycarboxylic acids. Examples of suitable polycarboxylic acids can include: phthalic acid, isophthalic acid, terephthalic acid, trimellitic acid, tetrahydrophthalic acid, adipic acid, succinic acid, glutaric acid, fumaric acid, and mixtures thereof. Anhydrides of the above acids, where they exist, can also be employed and are encompassed by the term "polycarboxylic acid". In addition, certain materials which react in a manner similar to acids to form polyester polyols are also useful. Such materials can include lactones, e.g., caprolactone, propiolactone and butyrolactone, and hydroxy acids such as hydroxycaproic acid and dimethylol propionic acid.

If a triol or polyhydric alcohol is used, a monocarboxylic acid, such as acetic acid and/or benzoic acid, may be used in the preparation of the polyester polyols, and for some purposes, such a polyester polyol may be desirable. Moreover, polyester polyols are understood herein to include polyester polyols modified with fatty acids or glyceride oils of fatty acids (i.e., conventional alkyd polyols containing such modification). Another polyester polyol which may be utilized is one prepared by reacting an alkylene oxide, e.g., ethylene oxide, propylene oxide, etc., and the glycidyl esters of versatic acid with methacrylic acid to form the corresponding ester.

Polycarbonate polyols can be formed by methods known in the art, as disclosed, for example, in U.S. Pat. No. 5,143,997 at column 3, line 43 to column 6, line 25, and U.S. Pat. No. 5,527,879 at column 2, line 10 to column 3, line 48, incorporated herein by reference. For example, polycarbonates are customarily obtained from the reaction of alcohols or phenols with phosgene or from the transesterification of alcohols or phenols with dialkyl or diaryl carbonates. Suitable polycarbonate functional polyols may be used that have been prepared by the reaction of a diol such as 1,6-hexanediol, $C_2$ (ethylene glycol) to $C_{36}$ diols such as neopentylglycol, butanediol, 1,10-decanediol, butylethyl propanediol, 2-ethyl-1,3-hexanediol, cyclohexanedimethanol, 2,2,4-trimethylpentane-1,3-diol, Esterdiol 204, and/or polytetrahydrofuran, with either phosgene or dimethylcarbonate.

Acrylic polyols can be prepared from polymerizable ethylenically unsaturated monomers, and are typically copolymers of (meth)acrylic acid or esters and hydroxylalkyl (meth)acrylic acid or esters. Non-limiting examples of suitable acrylic polyols can include polymerizable ethylenically unsaturated monomers such as alkyl esters of (meth)acrylic acid including methyl (meth)acrylate, ethyl (meth)acrylate, butyl (meth)acrylate and 2-ethyl hexylacrylate, and vinyl aromatic compounds such as styrene, alpha-methyl styrene, and vinyl toluene. Non-limiting examples of suitable hydroxylalkyl (meth)acrylic acids or esters include hydroxyethyl (meth)acrylate, hydroxypropyl (meth)acrylate, hydroxycyclohexyl (meth)acrylate, 6-hydroxyhexyl(meth) acrylate, and 12-hydroxydodecyl (meth)acrylate.

Additionally, silicon-containing polyols can be used such as hydroxyl terminated silicon-urethane copolymers which include the reaction product(s) of a one-step reaction of reactants comprising a diisocyanate, a polycarbonate diol, a polysiloxane, a $C_2$-$C_8$ diol chain extender and, optionally, a monofunctional siloxane chain terminator. Preparation of such hydroxyl terminated silicon-containing copolymers is described in detail in U.S. Pat. No. 8,242,189 B2 at column 2, line 49 to column 7, line 55, which is incorporated by reference herein. The preparation of hydroxyl terminated silicon-containing copolymers is also described in detail in U.S. Pat. No. 6,313,254 B1 column 2, line 58 to column 8 line 40, which is incorporated by reference herein. Also, suitable silicon-containing polyols can include the silicon-containing diols described in detail in U.S. Pat. No. 6,420,452 B1 at column 2, line 47 to column 5, line 7, which is incorporated by reference herein.

Non-limiting examples of suitable poly(urea)urethane polyols are known and can be prepared by reaction of a polyisocyanate, a polyol, and a polyamine to form a hydroxyl functional poly(urea)urethane polymer. Suitable poly(urea)urethane polyols may also be prepared from an isocyanate functional urea prepolymer with an excess of organic polyol to form a hydroxyl functional poly(urea) urethane polymer. Examples of polyisocyanates and organic polyols useful in the preparation of poly(urea)urethane polyols include the polyisocyanates and polyols described above. Examples of suitable amines can include but are not limited to aliphatic amines, cycloaliphatic amines, aromatic amines and mixtures thereof. Further, the amine can be a polyamine having at least two functional groups independently chosen from primary amine (—$NH_2$), secondary amine (—NH—) and combinations thereof.

Polyamide polyols and the preparation thereof are known. For example, amide-containing polyols may be prepared by the reaction of neopentyl glycol, adipic acid, and hexamethylenediamine. The polyamide polyols may also be prepared through aminolysis by the reaction, for example, of carboxylates, carboxylic acids, or lactones with amino alcohols. Examples of suitable diamines and amino alcohols include hexamethylenediamines, ethylenediamines, phenylenediamine, monoethanolamine, diethanolamine, isophorone diamine, and the like.

The thermoplastic polyol (i) can be present in the adhesive composition in an amount greater than or equal to 60 percent by weight, such as greater than 70 percent by weight, or greater than 75 percent by weight, or greater than 80 percent by weight, or greater than 85 percent by weight, based on total combined weight of solids present in the thermoplastic polyol (i) and the poly(anhydride) (ii). The thermoplastic polyol (i) can be present in the adhesive composition in an amount less than or equal to 99.9 percent by weight, such as less than or equal to 99.6 percent by weight, or less than or equal to 95 percent by weight, or less than or equal to 90 percent by weight, or less than or equal to 85 percent by weight, or less than or equal to 75 percent by weight, based on total combined weight of solids present in the thermoplastic polyol (i) and the poly(anhydride) (ii). The thermoplastic polyol (i) can be present in the adhesive composition in an amount ranging between any of the recited ranges inclusive of the recited values. For example, the thermoplastic polyol (i) can be present in the adhesive composition in an amount ranging from greater than or equal to 60 to 99.6 percent by weight, such as 65 to 99.5 percent by weight, or 70 to 99 percent by weight, where weight percentages are based on total combined weight of solids present in the thermoplastic polyol (i) and the poly(anhydride) (ii).

Further, the thermoplastic polyol (i) can be present in the photochromic adhesive composition in an amount of at least 45 percent by weight, such as at least 50 percent by weight, where weight percentages are based on weight of total solids present in the adhesive composition.

The composition used to form the adhesive layer (b) also comprises (ii) a poly(anhydride). For the purposes of the present invention, the term "poly(anhydride)" refers to a polymer having on average at least two cyclic carboxylic acid anhydride groups per molecule, such as at least three cyclic carboxylic acid anhydride groups per molecule. The poly(anhydride) (ii) can be prepared by free-radical initiated addition polymerization of an ethylenically unsaturated monomer having anhydride functionality such as maleic anhydride, citraconic anhydride, itaconic anhydride, propenyl succinic anhydride and the like, with other ethylenically unsaturated monomers substantially free of anhydride functionality. Examples of such ethylenically unsaturated materials can include, but are not limited to, esters of (meth) acrylic acids, such as methyl acrylate, methyl methacrylate, butyl acrylate and butyl methacrylate; vinyl compounds such as vinyl acetate and vinyl chloride; styrene-based materials such as styrene itself and alpha-methylstyrene; allyl compounds such as allyl chloride and allyl acetate and other co-polymerizable ethylenically unsaturated monomers such as acrylonitrile and methacrylonitrile, amides such as acrylamide and methacrylamide, dienes such as 1,3-butadiene, $C_1$ to $C_{24}$ olefins, and mixtures of such ethylenically unsaturated materials.

A "cyclic anhydride", as used herein, refers to a molecule comprising at least one closed ring structure, wherein the closed ring structure comprises an anhydride group. The poly(anhydride) (ii) may comprise at least three cyclic anhydride groups per molecule. The poly(anhydride) (ii) comprising at least three cyclic anhydride groups may be prepared from a cyclic anhydride monomer, such as maleic anhydride.

The poly(anhydride) (ii) can comprise at least one copolymer selected from the group consisting of a copolymer of maleic anhydride and a $C_2$-$C_{24}$ olefin, a copolymer of maleic anhydride and (meth)acrylate, a copolymer of maleic anhydride and styrene, and mixtures thereof. For example, the poly(anhydride) (ii) can comprise a copolymer of maleic anhydride and a $C_2$-$C_{24}$ olefin, such as a $C_{10}$-$C_{24}$ olefin, or a $C_{10}$-$C_{20}$ olefin, or a $C_{15}$-$C_{24}$ olefin, or a $C_{15}$-$C_{20}$ olefin. The poly(anhydride) (ii) can comprise a copolymer of maleic anhydride and 1-octadecene.

The poly(anhydride) (ii) can have a number average molecular weight (Mn) of at least 500 g/mol, or at least 1,000 g/mol, or at least 5,000 g/mol, or at least 10,000 g/mol, or at least 25,000 g/mol. Also the poly(anhydride) (ii) can have a Mn of less than or equal to 100,000 g/mol, or less than or equal to 75,000 g/mol, or less than or equal to 60,000 g/mol, or less than or equal to 50,000 g/mol. The poly(anhydride) (ii) can have a Mn ranging from 500 to 100,000 g/mol, such as from 1,000 to 100,000 g/mol, or from 5,000 to 75,000 g/mol, or from 10,000 to 60,000 g/mol, or from 25,000 to 60,000 g/mol. For purposes of the present invention, the number average molecular weight of the poly(anhydride) (ii) was determined by SEC-TD as described above in reference to Mn of the thermoplastic polyol (i).

Further, the ratio of equivalents of anhydride groups present in the poly(anhydride) (ii) to the equivalents of hydroxyl groups present in the thermoplastic polyol (i) can range from 1:4 to 20:1, such as from 1:2 to 10:1, or from 1:1 to 5:1.

Generally, the poly(anhydride) (ii) can be present in the adhesive composition in an amount greater than or equal to 0.3 percent by weight, such as greater than or equal to 0.4 percent by weight, or greater than or equal to 0.5 percent by weight, or greater than or equal to 1.0 percent by weight, or greater than or equal to 2.0 percent by weight, or greater than or equal to 3.0 percent by weight, based on total combined weight of solids present in the thermoplastic polyol (i) and the poly(anhydride) (ii). The poly(anhydride) (ii) can be present in the adhesive composition in an amount less than or equal to 40 percent by weight, such as less than or equal to 38 percent by weight, or less than or equal to 35 percent by weight, or less than or equal to 30 percent by weight, or less than or equal to 25 percent by weight, or less than or equal to 20 percent by weight, based on total combined weight of solids present in the thermoplastic polyol (i) and the poly(anhydride) (ii). The poly(anhydride) (ii) can be present in the adhesive composition in an amount ranging between any of the recited ranges inclusive of the recited values. For example, the poly(anhydride) (ii) can be present in the adhesive composition in an amount ranging from 0.3 to 40 percent by weight, such as from 0.4 to 40 percent by weight, or from 0.5 to 39.9 percent by weight, or from 1 to 38 percent by weight, where weight percentages are based on the total combined weight of solids present in the thermoplastic polyol (i) and the poly(anhydride) (ii).

The composition used to form the adhesive layer (b) also comprises a photochromic material (iii). The photochromic material can include any of the art recognized photochromic compounds.

As used herein, the term "photochromic material" includes both thermally reversible and non-thermally reversible (or photo-reversible) photochromic compounds. Generally, although not limiting herein, when two or more photochromic materials are used in conjunction with each other, the various materials can be chosen to complement one another to produce a desired color or hue. For example, mixtures of photochromic compounds can be used to attain certain activated colors, such as a near neutral gray or near neutral brown. See, for example, U.S. Pat. No. 5,645,767, column 12, line 66 to column 13, line 19, the disclosure of which is specifically incorporated by reference herein, which describes the parameters that define neutral gray and brown colors.

The photochromic material can comprise any of a variety of organic and inorganic photochromic materials. The photochromic material(s) can include but is not limited to any of the following classes of materials: chromenes, e.g., naphthopyrans, benzopyrans, indenonaphthopyrans, phenanthropyrans or mixtures thereof; spiropyrans, e.g., spiro(benzindoline)naphthopyrans, spiro(indoline)benzopyrans, spiro(indoline)naphthopyrans, spiro(indoline)quinopyrans and spiro(indoline)pyrans; oxazines, e.g., spiro(indoline)naphthoxazines, spiro(indoline)pyridobenzoxazines, spiro(benzindoline)pyridobenzoxazines, spiro(benzindoline)naphthoxazines and spiro(indoline)benzoxazines; mercury dithizonates, fulgides, fulgimides and mixtures of such photochromic compounds.

Generally, the photochromic material (iii) can be selected from the group consisting of naphthopyrans, benzopyrans, indenonaphthopyrans, phenanthropyrans, spiropyrans, oxazines, mercury dithiozonates, fulgides, fulgimides, and mixtures thereof.

Such photochromic materials and complementary photochromic materials are described in U.S. Pat. No. 4,931,220 at column 8, line 52 to column 22, line 40; U.S. Pat. No. 5,645,767 at column 1, line 10 to column 12, line 57; U.S. Pat. No. 5,658,501 at column 1, line 64 to column 13, line 17; U.S. Pat. No. 6,153,126 at column 2, line 18 to column 8, line 60; U.S. Pat. No. 6,296,785 at column 2, line 47 to column 31, line 5; U.S. Pat. No. 6,348,604 at column 3, line 26 to column 17, line 15; and U.S. Pat. No. 6,353,102 at column 1, line 62 to column 11, line 64, the disclosures of the aforementioned patents are incorporated herein by reference. Spiro(indoline)pyrans are also described in the text, Techniques in Chemistry, Volume III, "Photochromism", Chapter 3, Glenn H. Brown, Editor, John Wiley and Sons, Inc., New York, 1971.

The photochromic materials can be polymerizable photochromic materials, such as polymerizable naphthoxazines disclosed in U.S. Pat. No. 5,166,345 at column 3, line 36 to column 14, line 3; polymerizable spirobenzopyrans disclosed in U.S. Pat. No. 5,236,958 at column 1, line 45 to column 6, line 65; polymerizable spirobenzopyrans and spirobenzothiopyrans disclosed in U.S. Pat. No. 5,252,742 at column 1, line 45 to column 6, line 65; polymerizable fulgides disclosed in U.S. Pat. No. 5,359,085 at column 5, line 25 to column 19, line 55; polymerizable naphthacenediones disclosed in U.S. Pat. No. 5,488,119 at column 1, line 29 to column 7, line 65; polymerizable spirooxazines disclosed in U.S. Pat. No. 5,821,287 at column 3, line 5 to column 11, line 39; polymerizable polyalkoxylated naphthopyrans disclosed in U.S. Pat. No. 6,113,814 at column 2, line 23 to column 23, line 29; and the polymerizable photochromic compounds disclosed in WO97/05213 and in U.S. Pat. No. 6,555,028 at column 1, line 16 to column 24, line 56. The disclosures of the aforementioned patents on polymerizable photochromic materials are incorporated herein by reference.

Other suitable photochromic materials can include organo-metal dithiozonates, e.g., (arylazo)-thioformic arylhydrazidates, e.g., mercury dithizonates which are described in, for example, U.S. Pat. No. 3,361,706 at column 2, line 27 to column 8, line 43; and fulgides and fulgimides, e.g., the 3-furyl and 3-thienyl fulgides and fulgimides, which are described in U.S. Pat. No. 4,931,220 at column 1, line 39 through column 22, line 41, the disclosures of which are incorporated herein by reference.

Suitable photochromic materials also can include the polymerizable polyalkoxylated naphthopyrans disclosed in U.S. Pat. No. 6,113,814, at column 2, line 24 to column 23, line 29, the cited portions of which are incorporated herein by reference. Additionally, suitable photochromic materials can include polymeric matrix compatibilized naphthopyran compounds such as those disclosed in U.S. Pat. No. 6,555, 028B2 at column 2, line 40 to column 24, line 56, the cited portions of which are incorporated herein by reference.

Further, the photochromic material can comprise a reaction product of at least one ring-opening cyclic monomer comprising a cyclic ester and/or a cyclic carbonate, and a photochromic initiator. Such materials and the preparation thereof are described in detail in U.S. Pat. No. 7,465,415 at column 12, line 27 to column 74, line 64, the cited portions of which are incorporated herein by reference.

The photochromic compounds may be used individually or in combination with other complementary photochromic compounds, i.e., organic photochromic compounds having at least one activated absorption maxima within the range of between about 400 and 700 nanometers, or substances containing same, that may be incorporated, e.g., dissolved or dispersed, in the composition used to form the adhesive layer, and which compounds or mixtures of compounds color when activated to an appropriate hue.

The amount of photochromic material present in the adhesive composition of the present invention generally is that amount which is sufficient to exhibit a desired change in optical density when the film laminate comprising the adhesive is exposed to actinic (e.g., ultraviolet) radiation. Typically, a sufficient amount is used to produce a photochromic effect discernible to the naked eye upon activation. Such amount is often described as a "photochromic amount". The photochromic amount depends upon the intensity of color desired upon exposure to actinic radiation and upon the method used to incorporate the photochromic materials into or onto an optical element.

The photochromic material (iii) can be present in the adhesive composition in an amount of at least 0.05 weight percent, or at least 0.1 weight percent, or at least 0.5 weight percent, or at least 0.7 weight percent, or at least 1 weight percent, where weight percentages are based on total weight of solids present in the adhesive composition. Also, the photochromic material (iii) can be present in the adhesive composition in an amount of less than or equal to 30 weight percent, such as less than or equal to 25 weight percent, or less than or equal to 20 weight percent, or less than or equal to 15 weight percent, or less than or equal to 10 weight percent, where weight percentages are based on total weight of solids present in the adhesive composition. It should be understood that the amount of photochromic material (iii) present in the adhesive composition can range between any of the recited values, inclusive of the recited values. For example, the photochromic material (iii) can be present in the photochromic adhesive composition in an amount ranging from 0.01 to 30 weight percent, such as from 0.5 to 25 weight percent, or from 0.5 to 20 weight percent, where weight percentages are based on weight of the total solids present in the adhesive composition. Generally, the adhesive composition comprises 0.05 to 20 weight percent photochromic material, where weight percentages are based on total solids present in the adhesive composition.

Also, any of the aforementioned adhesive compositions can further comprise one or more acid-reactive materials which are different from the thermoplastic polyol (i) and the poly(anhydride) (ii). As used herein, by "acid-reactive material" is meant a material which can react with a carboxylic acid group to form a covalent bond. It should be understood that the reaction between the hydroxyl groups of the thermoplastic polyol (i) and the anhydride groups of the poly (anhydride) (ii) can result in the formation of ester bonds and unreacted carboxylic acid groups. The additional acid-reactive materials suitable for use in the photochromic adhesive composition of the present invention allows for further curing (i.e., crosslinking) between the carboxylic acid groups and the functional groups of the additional reactive materials. Non-limiting examples of suitable acid-reactive materials can include, but are not limited to, any of those selected from the group consisting of epoxy-functional materials, polycarbodiimides, oxazoline-functional materials, beta-hydroxyl alkylamides, and mixtures thereof.

Non-limiting examples of suitable epoxy-functional materials can include those described in U.S. Pat. No. 5,256,452 column 3, line 28 to column 4, line 46, which disclosure is incorporated herein by reference. These non-limiting examples can include, but are not limited to, acrylic polymers containing epoxy groups, polygycidyl ethers of alcohols, and polygycidyl esters of polycarboxylic acids. Non-limiting examples also include epoxy functional silanes, such as Silquest A-187 from Momentive.

As used herein, the term "polycarbodiimide" refers to a polymer containing two or more units having the structure: —N=C=N—. The polycarbodiimides can generally be prepared by a condensation reaction of a polyisocyanate in the presence of a suitable catalyst to form a polycarbodiimide intermediate having terminal NCO-functionalities and by terminating and/or chain extending the polycarbodiimide intermediate by the addition of one or more active hydrogen-containing compounds, such as an amine and/or a hydroxy-containing compound.

Suitable polyisocyanates for the condensation reaction, include, without limitation, aliphatic, including cycloaliphatic, polyisocyanates. Such polyisocyanates can contain, for example, from 2 to 4, such as 2 isocyanate groups per molecule. Examples of suitable aliphatic and cycloaliphatic diisocyanates are methylene-bis(4-cyclohexylisocyanate), isophorone diisocyanate, 1,4-cyclohexyl diisocyanate, 1,3-bis(isocyanatomethyl)cyclohexane, meta-tetramethylxylene diisocyanate ("TMXDI"), and/or a mixture thereof. Substituted polyisocyanates can also be used in which the substituents are nitro, chloro, alkoxy and other groups that are not reactive with hydroxyl groups or active hydrogens and provided the substituents are not positioned to render the isocyanate group unreactive.

The polyisocyanate can be an NCO-containing adduct such as would be formed, for example, when an active hydrogen-containing compound is present before or during polycarbodiimide formation, as described below.

The foregoing polycarbodiimide polymers can be made by any of a variety of methods starting from a polycarbodiimide intermediate having terminal NCO-functionalities. Moreover, the polycarbodiimide polymers can be produced from a polycarbodiimide intermediate made with or without use of an active hydrogen-containing chain extender.

The active hydrogen-containing chain extender is a spacer capable of linking polyisocyanates together or linking isocyanate functional polycarbodiimides together, depending upon when the active hydrogen compound is added. For example, the chain extender can be added before, during, or after formation of the polycarbodiimide intermediate having terminal NCO-functionalities.

Any suitable compound containing active hydrogens may be used as the chain extender, if a chain extender is employed. The term "active hydrogen atoms" refers to hydrogens which, because of their position in the molecule, display activity according to the Zerewitinoff test. Accordingly, active hydrogens include hydrogen atoms attached to oxygen, nitrogen, or sulfur, and thus useful compounds will include those having at least two hydroxyl, thiol, primary amine, and/or secondary amine groups (in any combination). For example, the active hydrogen-containing chain extender contains from 2 to 4 active hydrogens per molecule.

Examples of such active hydrogen-containing chain extender compounds include alcohols, which include polyols, amines, which includes polyamines, aminoalcohols, and mercapto-terminated derivatives. For this purpose, the term "polyol" is meant to include low molecular weight materials having an average of two or more hydroxyl groups per molecule and excludes high molecular weight polyols including polyethoxy or polypropxy groups (e.g., polyethylene glycol). By "low molecular weight materials" it is meant compounds having molecular weights Mw ranging from 0 to 1000 g/mol, such as 10 to 500 g/mol or 20 to 300 g/mol or 30 to 200 g/mol, or 50 to 150 g/mol or any other combination of numbers within any of these ranges. Suitable polyols for this purpose include low molecular weight diols, triols and higher alcohols, and low molecular weight amide-containing polyols. The low molecular weight diols, triols and higher alcohols include cycloaliphatic polyols such as 1,2-cyclohexanediol and cyclohexane dimethanol, aliphatic polyols, particularly alkylene polyols containing from 2 to 18 carbon atoms. Examples can include ethylene glycol, 1,4-butanediol, and 1,6-hexanediol. Examples of triols and higher alcohols include trimethylol propane, glycerol and pentaerythritol. Such chain extended polycarbodiimides comprise urethane linkages.

As mentioned above, to prepare a polycarbodiimide, an isocyanate terminated polycarbodiimide intermediate is first formed by condensation reaction of a polyisocyanate, which may or may not have been previously chain extended by the reaction of a polyisocyanate with an active-hydrogen containing chain extender of the type previously described. The polyisocyanate is condensed with the elimination of carbon dioxide to form the isocyanate terminated polycarbodiimide.

The condensation reaction is typically conducted by taking the solution of a polyisocyanate and heating in the presence of suitable catalyst. Such reaction is described, for example, by K. Wagner et al., Angew. Chem. Int. Ed. Engl., vol. 20, p. 819-830 (1981). Representative examples of suitable catalysts are described in e.g. U.S. Pat. Nos. 2,941,988, 3,862,989 and 3,896,251. Examples include 1-ethyl-3-phospholine, 1-ethyl-3-methyl-3-phospholine-1-oxide, 1-ethyl-3-methyl-3-phospholine-1-sulfide, 1-ethyl-3-methyl-phospholidine, 1-methylphospholen-1-oxide, 1-ethyl-3-methyl-phospholidine-1-oxide, 3-methyl-1-phenyl-3-phospholine-1-oxide and bicyclic terpene alkyl or hydrocarbyl aryl phosphine oxide or camphene phenyl phosphine oxide. The particular amount of catalyst used will depend to a large extent on the reactivity of the catalyst itself and the polyisocyanate being used. A concentration range of 0.05-5 parts of catalyst per 100 parts of polyisocyanate is generally suitable.

The preparation of suitable polycarbodiimides is described in detail in U.S. Pat. No. 9,957,394 B2 at column 4, line 11 to column 5, line 63, which disclosure is incorporated herein by reference.

Non-limiting examples of suitable oxazoline-functional materials and the preparation thereof are those described in US 2019/0185700 A1, paragraphs [0026] to [0042], which disclosure is incorporated herein by reference. Specific non-limiting examples of suitable oxazoline-functional materials can include 1,2-phenylene-bis-oxazoline; 1,3-phenylene-bis-oxazoline; 1,4-phenylene-bis-oxazoline; I,2-bis(oxazolinyl-4-methyl)benzene; I,3-bis(oxazolinyl-4-methyl)benzene; 1,4-bis(oxazolinyl-4-methyl)benzene; I,2-bis(oxazolinyl-5-ethyl)benzene; I,3-bis(oxazolinyl-5-methyl)benzene; 1,3-bis(oxazolinyl-5-ethyl)benzene; 1,4-bis(oxazolinyl-5-ethyl)benzene; I,2,4-tris(oxazolinyl)benzene; 1,3,5-tris(oxazolinyl)benzene; 1,2,4,5 tetrakis(oxazolinyl)benzene; 2,6-bis(2-oxazolin-2-yl)pyridine (and also derivatives with alkyl or aryl substituents on the oxazoline ring), 2,6-bis(8H indeno1,2-dioxazolin-2-yl)pyridine, 1.2-bis(4,4-dimethyl 2-oxazolin-2-yl)ethane (and also derivatives with alkyl or aryl substituents on the oxazoline ring), 2.2-isopropylidenebis-2-oxazoline (and also derivatives with alkyl or aryl substituents on the oxazoline ring) and also copolymers consisting of 2-methylvinyl-2-oxazoline, such as Epocros™ RP-5, RP-6 and RPS-1005 from Nippon Shokubai. Other co-polymers of polymerizable 2-isopropenyl-2-oxazoline with ethylenically unsaturated materials can include, but are not limited to, esters of (meth)acrylic acids, such as methyl acrylate, methyl methacrylate, butyl acrylate and butyl methacrylate; vinyl compounds such as vinyl acetate and vinyl chloride; styrene-based materials such as styrene itself and alpha-methylstyrene; allyl compounds such as allyl chloride and allyl acetate and other co-polymerizable ethylenically unsaturated monomers such as acrylonitrile and methacrylonitrile, amides such as acrylamide and methacrylamide, dienes such as 1,3-butadiene, $C_2$-$C_{24}$ olefins, and mixtures of such ethylenically unsaturated materials.

Non-limiting examples of suitable beta-hydroxylalkyl amides can include those that contain the following chemical substructure:

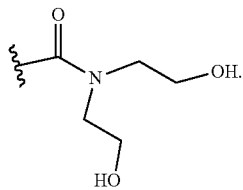 [SMILES: *C(=O)N(CCO)CCO]

Also, suitable beta-hydroxylalkyl amides can include, but are not limited to, those commercially available from EMS-Chemie, such as PRIMID® XL-552, PRIMID® QM-1260, and PRIMID® SF-4510.

When present, the additional acid-reactive material can be present in the adhesive composition in an amount ranging from 0.1 to 30 weight percent, such as from 0.5 to 25 weight percent, or from 1 to 20 weight percent, or from 2 to 15 weight percent where weight percentages are based on total combined weight of solids present in the thermoplastic polyol (i), the poly(anhydride) (ii), and the additional acid-reactive material.

The adhesive composition used in the preparation of the film laminate of the present invention also can contain optional adjuvants as are well known in the art, for example, to impart desired properties or characteristics to the composition, or which may facilitate the process(es) used to apply and/or cure the composition. Such optional adjuvants can include, but are not limited to, ultraviolet light absorbers, light stabilizers, such as hindered amine light stabilizers, heat stabilizers, rheology control agents, leveling agents, e.g., surfactants, free radical scavengers, antioxidants, adhesion promoters, catalysts, and the like. Mixtures of such adjuvants may be employed.

Also, the adhesive compositions of the present invention can further include one or more fixed-tint dyes. As used herein, the term "fixed-tint dye" and related terms, such as "fixed-colorant", "static colorant", "fixed dye", and "static dye", means dyes that are non-photosensitive materials, which do not physically or chemically respond to electromagnetic radiation with regard to the visually observed color thereof. The term "fixed-tint dye" and related terms as used herein does not include and is distinguishable from photochromic material or compound. As used herein, the term "non-photosensitive materials" means materials that do not physically or chemically respond to electromagnetic radiation with regard to the visually observed color thereof, including, but not limited to, fixed-tint dyes.

One or more fixed-tint dyes can be present in the adhesive composition of the present invention for purposes including, but not limited to, providing a photochromic layer and photochromic article having at least a first color characteristic of the fixed-tint dye, when the photochromic material is not activated such as by exposure to actinic radiation; and optionally a second color characteristic of the combination of the fixed-tint dye and the photochromic material when the photochromic material is activated, such as by exposure to actinic radiation.

The optional fixed-tint dye can include, for example, at least one of azo dyes, anthraquinone dyes, xanthene dyes, azime dyes, iodine, iodide salts, polyazo dyes, stilbene dyes, pyrazolone dyes, triphenylmethane dyes, quinoline dyes, oxazine dyes, thiazine dyes, and polyene dyes. The fixed-tint dye can be present in the adhesive composition in varying amounts to provide the intended effect in the cured article prepared therefrom. The fixed-tint dye can be present in the adhesive composition in an amount ranging from 0.001 to 15 weight percent, such as from 0.01 to 10 weight percent, or from 0.1 to 2.5 weight percent, where the weight percentages are based on weight of the total solids present in the adhesive composition.

The adhesive composition employed in the preparation of the photochromic film laminate of the present invention also can include solvents. If present, suitable solvents can include water, organic solvents, and combinations thereof.

Classes of organic solvents that can be present in the adhesive compositions of the present invention can include, but are not limited to, alcohols, such as iso-propanol, sec-butyl alcohol, tert-butyl alcohol, iso-butyl alcohol; ketones or ketoalcohols, such as acetone, methyl ethyl ketone, and diacetone alcohol; ethers, such as dimethyl ether and methyl ethyl ether; cyclic ethers, such as tetrahydrofuran, dioxane, and dihydroevoglucosenone; esters, such as ethyl acetate, ethyl lactate, ethylene carbonate and propylene carbonate; hydroxy functional ethers of alkylene glycols, such as methyl 2-hydroxypropyl ether and phenyl 2-hydroxypropyl ether; nitrogen containing cyclic compounds, such as pyrrolidone, N-methyl-2-pyrrolidone, N-butyl-2-pyrrolidone, and 1,3-dimethyl-2-imidazolidinone; amides, such as N,N-dimethylformamide, and N,N-dimethylacetamide; sulfur containing compounds, such as dimethyl sulfoxide and tetramethylene sulfone; aromatic compounds, such as toluene, xylene, anisole, and butyl benzoate; and mixtures of aromatic compounds, such as, but not limited to, Aromatic 100 Fluid, which is a commercially available mixture of $C_9$-$C_{10}$ dialkyl- and trialkyl-benzenes.

Solvent(s) can be present in the adhesive compositions of the present invention in an amount ranging from 1 to 98 percent by weight, such as from 10 to 95 percent by weight, or from 20 to 90 percent by weight, or from 40 to 85 percent by weight, in each case based on the total weight of the adhesive composition (including the weight of the solvent).

The adhesive composition of the present invention can be at least partially cured by any suitable method known in the art. For example, the adhesive composition can be at least partially cured at (or under) ambient conditions, such as at a temperature ranging from 21° C. to 27° C. Also, the adhesive composition can be at least partially cured by exposure to elevated temperature (in excess of ambient room temperature). As used herein, by "cured" is meant a three-dimensional crosslink network is formed by covalent bond formation, for example, between the hydroxyl groups of the thermoplastic polyol component (i) and anhydride groups of the poly(anhydride) (ii); and, if present, any of the acid-reactive materials discussed above with carboxylic acid groups generated by the reaction between the thermoplastic polyol (i) and the poly(anhydride) (ii). When at least partially cured at elevated temperature, the cure temperature is variable and depends in part on the amount of time during which curing is conducted as well as process conditions under which the film laminate itself is prepared or conditions under which the film laminate is used to prepare an optical element.

The photochromic adhesive composition according to the present invention typically is substantially free, or is essentially free, or is completely free of an isocyanate functional group-containing material. The term "substantially free" as used in this context means the photochromic adhesive composition contains less than 1000 parts per million (ppm) of a component based on the total solids weight of the adhesive composition; "essentially free" means the photochromic adhesive composition contains less than 100 ppm of a component based on the total solids weight of the adhesive composition, and "completely free" means the photochromic adhesive composition contains less than 20 parts per billion (ppb) of a component based on the total solids weight of the adhesive composition.

The photochromic film laminate of the present invention can be prepared by any of a variety of known lamination techniques. Examples of suitable lamination methods can include, but are not limited to, casting lamination (also referred to as coating-lamination) and extrusion lamination techniques. For example, the photochromic adhesive composition can be applied to (i.e., cast onto or coated onto) the first polymeric film layer, optionally, at least partially cured, and then laminated to the second polymeric film layer, if desired. Alternatively, the photochromic adhesive composition first can be cast onto a release liner (for example by slot-die, knife-over-roll, reverse-roll, or gravure application methods) and then, optionally, at least partially cured. The photochromic film laminate then can be prepared by transfer-lamination methods which involves removal of the release liner and lamination of the adhesive layer to the first polymeric layer, and, if desired, to the second polymeric layer using known lamination methods.

The photochromic film laminate of the present invention is especially suitable for use in the preparation of optical elements such as optical articles selected from ophthalmic articles, such as lenses, display articles, such as display screens, windows, mirrors, active liquid crystal cells, and passive liquid crystal cells.

For example, the optical articles prepared with the photochromic film laminate of the present invention can include ophthalmic articles selected from corrective lenses, non-corrective lenses (plano lenses), contact lenses, intra-ocular lenses, magnifying lenses, protective lenses and visors.

As mentioned previously, the photochromic film laminate of the present invention is useful for the preparation of laminated optical articles such as any of those previously mentioned, and is particularly useful for the preparation of lenses. Such optical articles can be prepared by various techniques known in the art, such as insert injection molding methods, an example of which is disclosed in U.S. Pat. No. 6,328,446. The cast method can be used, a process for which is described in US Patent Publication 2007/0122626 but using an adhesive composition different from that of the present invention.

An example of a photochromic film laminate 10 is illustrated in FIG. 1. The laminate 10 comprises a first polymeric film layer 12 having a first surface 14 and a second surface 16. An adhesive layer 18 is located over at least a portion of the first surface 14 of the first polymeric film layer 12. The laminate 10 is illustrated as including an optical second polymeric film layer 20 having a first surface 22 and a second surface 24. At least a portion of the first surface 22 of the second polymeric film layer 20 is located over the adhesive layer 18.

The present invention can be further characterized by one or more of the following non-limiting clauses.

Clause 1. A photochromic film laminate comprising at least:
(a) a first polymeric film layer having a first surface and an opposing second surface; and
(b) an adhesive layer over at least a portion of and in direct contact with the first surface of the first polymeric film layer (a), said adhesive layer formed from an adhesive composition, such as a photochromic adhesive composition, comprising:
(i) a thermoplastic polyol having a number average molecular weight greater than or equal to 30,000 g/mol;
(ii) a poly(anhydride); and
(iii) a photochromic material,
wherein the thermoplastic polyol (i) is present in the composition in an amount greater than or equal to 60 percent by weight based on total combined weight of solids present in the thermoplastic polyol (i) and the poly(anhydride) (ii).

Clause 2. The photochromic laminate of clause 1, further comprising (c) a second polymeric film layer, which is the same or different from the first polymeric film layer (a), the second polymeric film layer having a first surface and an opposing second surface, wherein the first surface is disposed over and in direct contact with at least a portion of the adhesive layer.

Clause 3. The photochromic laminate of clause 1 or 2, wherein the first polymeric film layer (a) and the second polymeric film layer (c) each independently comprises a polymer selected from the group consisting of polycarbonate, polycyclic alkene, polyurethane, poly(urea)urethane, polythiourethane, polythio(urea)urethane, poly(allyl carbonate), cellulose acetate, cellulose diacetate, cellulose triacetate, cellulose acetate propionate, cellulose acetate butyrate, poly(vinyl acetate), poly(vinyl alcohol), poly(vinyl chloride), poly(vinylidene chloride), poly(ethylene terephthalate), polyester, polysulfone, polyolefin, polyether, polyamide, polyalkyl(meth)acrylate, polyvinyl butyral, copolymers thereof, and mixtures thereof.

Clause 4. The photochromic laminate of any of clauses 1 to 3, wherein the thermoplastic polyol (i) comprises a thermoplastic polyol selected from the group consisting of a polyurethane polyol, a polyether polyol, a polyester polyol, a polycarbonate polyol, an acrylic polyol, a polydimethylsiloxane polyol, a poly(urea)urethane polyol, a polyamide polyol, copolymers thereof, and mixtures thereof.

Clause 5. The photochromic laminate of any of clauses 1 to 4, wherein the thermoplastic polyol (i) has a Shore A hardness of less than 90 as determined by ASTM D2240.

Clause 6. The photochromic laminate of any of clauses 1 to 5, wherein the thermoplastic polyol (i) comprises a thermoplastic diol.

Clause 7. The photochromic laminate of any of clauses 1 to 6, wherein the thermoplastic polyol (i) comprises an aliphatic thermoplastic polyurethane diol.

Clause 8. The photochromic laminate of any of clauses 1 to 7, wherein the poly(anhydride) (ii) comprises a polymer having an average of at least two cyclic carboxylic acid anhydride groups per molecule.

Clause 9. The photochromic laminate of any of clauses 1 to 8, wherein the poly(anhydride) (ii) comprises at least one copolymer selected from the group consisting of
a copolymer of maleic anhydride and a $C_2$-$C_{24}$ olefin,
a copolymer of maleic anhydride and (meth)acrylate,
a copolymer of maleic anhydride and styrene,
and mixtures thereof.

Clause 10. The photochromic laminate of any of clauses 1 to 9, wherein the poly(anhydride) (ii) has a number average molecular weight of 500 to 100,000 g/mol.

Clause 11. The photochromic laminate of any of clauses 1 to 10, wherein the ratio of equivalents of anhydride groups present in the poly(anhydride) (ii) to the equivalents of hydroxyl groups present in the thermoplastic polyol (i) ranges from 1:4 to 20:1.

Clause 12. The photochromic laminate of any of clauses 1 to 11, wherein the adhesive composition further comprises an acid-reactive material selected from the group consisting of epoxy-functional materials, polycarbodiimides, oxazoline-functional materials, beta-hydroxyl alkylamides, and mixtures thereof.

Clause 13. The photochromic laminate of any of clauses 1 to 12, wherein the photochromic material (iii) is selected from the group consisting of naphthopyrans, benzopyrans, indenonaphthopyrans, phenanthropyrans, spiropyrans, oxazines, mercury dithiozonates, fulgides, fulgimides, and mixtures thereof.

Clause 14. The photochromic laminate of any of clauses 1 to 13, wherein the adhesive composition comprises 0.05 to 20 weight percent photochromic material, where weight percentages are based on total solids present in the adhesive composition.

Clause 15. The photochromic laminate of any of clauses 1 to 14, wherein the adhesive composition further comprises 0.1 to 30 weight percent of an acid-reactive material where weight percentages are based on the combined weight of total solids present in the thermoplastic polyol (i), the poly(anhydride) (ii), and the acid-reactive material.

Clause 16. The photochromic laminate of any of clauses 1 to 15, wherein the first polymeric film layer (a) and/or the second polymeric film layer (c) each independently further comprises at least one additional layer selected from the group consisting of a primer layer, a release film layer, a tie layer, a barrier layer, an adhesion-promoting layer, a UV absorbing layer, and combinations thereof.

Clause 17. The photochromic laminate of any of clauses 1 to 16, wherein the adhesive composition is essentially free of an isocyanate functional group-containing material.

Clause 18. The photochromic laminate of any of clauses 1 to 16, wherein the adhesive composition is completely free of an isocyanate functional group-containing material.

Clause 19. A photochromic film laminate comprising at least:
  (a) a first polymeric film layer having a first surface and an opposing second surface;
  (b) an adhesive layer over at least a portion of and in direct contact with the first surface of the first polymeric film layer (a), said adhesive layer formed from a photochromic adhesive composition comprising:
    (i) a thermoplastic polyol having a number average molecular weight greater than or equal to 30,000 g/mol;
    (ii) a poly(anhydride);
    (iii) a photochromic material, and
    (iv) an acid-reactive material; and
  (c) a second polymeric film layer, which is the same or different from the first polymeric film layer (a), the second polymeric film layer having a first surface and an opposing second surface, wherein the first surface is disposed over and in direct contact with at least a portion of the adhesive layer,
  wherein the thermoplastic polyol (i) is present in the adhesive composition in an amount greater than or equal to 60 percent by weight based on total combined weight of solids present in the thermoplastic polyol (i) and the poly(anhydride) (ii).

Clause 20. The photochromic film laminate of any of clauses 1 to 19, wherein the thermoplastic polyol (i) is present in the photochromic adhesive composition in an amount of at least 45 percent by weight, such as at least 50 percent by weight, where weight percentages are based on weight of total solids present in the adhesive composition.

Clause 21. An optical article comprising the photochromic laminate of any of clauses 1 to 20.

Clause 22. The optical article of clause 21, wherein the optical article is a lens.

The present invention is more particularly described in the following examples, which are intended to be illustrative only, since numerous modifications and variations therein will be apparent to those skilled in the art.

EXAMPLES

Photochromic Composition:

The photochromic composition used in the following adhesive compositions was prepared as follows. The materials in Table 1 below were combined, in order, and stirred at 200 rpm at room temperature for a minimum of two hours until all the materials dissolved. The composition thus prepared is hereinafter referred to as "Photochromic Composition A".

TABLE 1

| Material | Parts by weight |
| --- | --- |
| Photochromic dyes[1] | 0.9093 |
| TINUVIN ® 144[2] | 0.6052 |
| IRGANOX ® 245[3] | 0.6053 |
| Tetrahydrofuran, anhydrous, inhibited | 147.54 |

[1]A mixture of indenonaphthopyrans designed to give a blue-gray color on activation.
[2]A hindered amine light stabilizer that also contains a sterically hindered phenolic antioxidant; commercially available from BASF.
[3]An antioxidant; commercially available from BASF.

Photochromic Adhesive Compositions:

Photochromic adhesive compositions used in the following examples were prepared as described below.

Example 1

The materials listed in Table 2 below were combined, in order, and stirred at 60 rpm at room temperature for a minimum of 16 hours until all the materials were dissolved.

TABLE 2

| Material | Parts by Weight |
| --- | --- |
| poly(maleic anhydride-alt-1-octadecene)[4] | 0.1273 |
| TECOFLEX ™ SG-80A[5] | 4.9322 |
| Photochromic Composition A | 24.9554 |

[4]Copolymer of maleic anhydride and 1-octadecene; calculated anhydride equivalent weight of 350.54 g/mol based on the reported alternating copolymer structure; reported average Mn of 30,000-50,000 g/mol; commercially available from Millipore Sigma.
[5]Aliphatic polyether based thermoplastic polyurethane diol; commercially available from Lubrizol LifeSciences. A sample of the material was characterized with size-exclusion chromatography using a Walters 2695 separation module with a Wyatt Technology Light Scattering detector (miniDAWN), a differential refractive index detector (Optilab rEX), and a Differential Viscometer detector (Viscostar). Three PL Gel Mixed C columns were used. Tetrahydrofuran was used as the eluent with a flow rate of one milliliter per minute. The instrument performance was validated with a 30 kDa polystyrene standard. The sample was found to have an Mn of ~53, 120 g/mol.

Example 2

The adhesive composition of Example 2 was prepared as described above in Example 1, using the components listed below in Table 3.

TABLE 3

| Material | Parts by weight |
| --- | --- |
| poly(maleic anhydride-alt-1-octadecene) | 0.2536 |
| TECOFLEX SG-80A | 4.8030 |
| Photochromic Composition A | 25.0125 |

Comparative Example 3

The components listed in Table 4 below were combined and stirred at 60 rpm at room temperature for at least 16 hours until all the materials were dissolved. This comparative example comprises no poly(anhydride).

TABLE 4

| Material | Parts by weight |
| --- | --- |
| TECOFLEX SG-80A | 5.0485 |
| Photochromic Composition A | 25.0458 |

Comparative Example 4

The components listed in Table 5 below were combined and stirred at 60 rpm at room temperature for at least 16 hours until all the materials were dissolved. This comparative example includes a blocked polyisocyanate crosslinker in place of a poly(anhydride).

TABLE 5

| Material | Parts by weight |
| --- | --- |
| TRIXENE ® BI-7960[6] | 0.3473 |
| TECOFLEX SG-80A | 4.7832 |
| Photochromic Composition A | 24.8409 |
| Dibutyltin dilaurate | 0.012 |

[6]Hexamethylene diisocyanate based crosslinker blocked with 3,5-dimethylpyrazole 70% solids in 1-methoxypropan-2-ol, available from Baxenden Chemical Co.

Example 5

Part A

Preparation of LEXAN™ Polycarbonate Laminates

Each of the photochromic adhesive compositions of Examples 1 and 2 and Comparative Examples 3 and 4 was applied via drawdown technique to D 3 CL PET 4400A/000 release liners (available from Loparex) using the 20 mil (0.5 mm) gap of a square metal applicator with a 3-inch (7.6 cm) wide coating width. After application, the coated release liners were left to rest for thirty minutes at room temperature. During this thirty-minute period, sections of ~250 micron thick LEXAN 8010 MC (a poly(bisphenol A-carbonate film available from Sabic) were plasma-treated for three minutes with an oxygen plasma at 100 watts of power using a 100 milliliter per minute oxygen flow rate. Each piece of LEXAN 8010 MC was then placed in a convection oven at a temperature of 125° C. for thirty minutes. The coated release liners were also placed in a convection oven at a temperature of 125° C. for thirty minutes.

Coated release liners were removed from the oven and laminated on the coated side with a piece of the treated and baked LEXAN 8010 MC while both the coated release liner and LEXAN 8010 MC were still warm using a benchtop rubber roller (Speedball 4121 Deluxe Hard Rubber Brayer—80 Durometer Roller). Next, the release liner was peeled away from the adhesive coating. The exposed adhesive was then laminated with a second piece of the treated and baked LEXAN 8010 MC using the same benchtop rubber roller. The three-layer laminate was placed in a convection oven at a temperature of 125° C. for 1.5 hours between two thin metal sheets and then cooled to room temperature. A 2"×2" (5 cm×5 cm) inch test specimen was cut from each laminate for the photochromic testing described in Part B below.

Part B

Photochromic Performance Testing

The photochromic performance of the LEXAN polycarbonate laminates prepared as described above in Part A was measured on an Advanced Bench for Measuring Photochromics ("A-BMP") optical bench. The laminates were first exposed to light with a maximum intensity near 365 nm for five minutes at a distance of 10 cm. The integrated UVA irradiance of this light was measured to be 7.7 watts per square meter using a Goosch & Housego OL 756 spectroradiometer with an OL 86-T cosine receptor. Next, the laminates were heated to a temperature of 70° C. and maintained at that temperature while exposing the laminates to an F17T8 yellow fluorescent light for 25 minutes at a distance of 10 cm to deactivate the photochromic materials. The irradiance of the fluorescent light at the laminate was measured with an OL 756 to be 9 Klux. Laminates were then kept in a dark environment at a temperature of 21° C. to 24° C. for a minimum of one hour prior to testing on the optical bench.

The bench was equipped with two 150 W Newport model #66902 xenon arc lamps at right angles to each other with associated Newport 69907 digital controllers. The first lamp was directed through a 3 mm SCHOTT KG-2 band-pass filter and appropriate neutral density filters to obtain the required ultraviolet and visible light spectra. The second lamp was directed through a 3 mm SCHOTT KG-2 band-pass filter, a SCHOTT GG400 short band cutoff filter, and appropriate neutral density filters to provide supplemental visible light. A 2"×2" (5 cm×5 cm) 50% polka dot beam splitter was placed at a 45° angle with respect to each lamp to mix the two beams. The intensity of the beams was adjusted with neutral density filters and the voltage of the xenon arc lamps. Proprietary software, PTSoft version 5.3, was used to control timing, irradiance, air cell and sample temperature, shuttering, filter selection, and the response measurement. The optical bench was maintained at a temperature of 23° C. during testing. The combined beam from the xenon arc lamps, used to activate the laminates, was adjusted to 6.7 watts per square meter UVA integrated over 315 nm to 380 nm and 50 Klux illuminance integrated over 380 nm to 780 nm. The sample cell was fitted with a quartz window and laminates centered within the holder. The temperature in the cell was controlled through the proprietary software with an AirJet XE custom-coupled to a bubbling water bath in order to deliver 50% relative humidity air at 23±0.1° C. The photochromic response of the laminate sample was measured using a ZEISS® model MCS 601 spectrophotomer with a fiber optic cable used for light delivery from a tungsten halogen lamp. The collimated beam from the lamp was positioned perpendicular to the test laminate such that it passed through the sample and into a receiving fiber optic cable attached to the spectrophotometer. The activating beam from the xenon arc lamps was incident on the laminate at an angle of 30° and positioned such that it overlapped the monitoring light to form two concentric circles.

The initial unactivated transmittance was measured with the shutter for the xenon arc lamps closed. The shutters were then opened and changes monitored at selected intervals. Changes in the optical density of the laminates were determined using the formula: $\Delta OD = \log_{10}(Tb/Ta)$, where Tb is the percent transmittance in the bleached state and Ta is the percent transmittance in the activated state. The $\Delta OD$ measurements were based on photopic optical density. For the test, shutters for the activating light were opened for 15 minutes and then closed in order to observe the activation and deactivation of the photochromic laminates. The results are shown in the following Table 6. The $T_{1/2}$ is the time in seconds for the $\Delta OD$ to reach half the activated $\Delta OD$ values once the shutter is closed after the 15-minute activation. If the $T_{1/2}$ time was between two recorded data points, the value was determined by linear interpolation between the nearest data point on each side of the $T_{1/2}$ time.

TABLE 6

Photochromic Performance of LEXAN Laminates

| Adhesive composition | ΔOD after 15 min. activation | $T_{1/2}$ (seconds) |
|---|---|---|
| Example 1 | 0.77 | 28 |
| Example 2 | 0.76 | 28 |
| Comparative Example 3 | 0.77 | 28 |
| Comparative Example 4 | 0.79 | 28 |

Part C

Preparation of MYLAR® Laminates

Each of the photochromic adhesive compositions of Examples 1 and 2, and Comparative Examples 3 and 4 was applied via drawdown technique to 118 micron thick MYLAR sheets (from Transcendia) using the 20 mil (0.5 mm) gap of a square metal applicator with a 3-inch (7.6 cm) wide coating width. After application, the coated MYLAR sheets were left to rest for thirty minutes at room temperature. Next, the coated MYLAR sheets were placed in a convection oven at a temperature of 125° C. for thirty minutes. The coated MYLAR sheets were removed from the oven and the adhesive coating laminated while still warm with a ~118 micron thick sheet of MYLAR (from Transcendia) using a benchtop rubber roller (Speedball 4121 Deluxe Hard Rubber Brayer—80 Durometer Roller). The three-layer laminate was placed in a convection oven at a temperature of 125° C. for 1.5 hours between two thin metal sheets and then cooled to room temperature. Two 2"×2" (5 cm×5 cm) test specimens were cut from each laminate for the heated press testing described below in Part D.

Part D

Heated Press Test

Each of the MYLAR laminates prepared as described above in Part C was tested in a heated hydraulic press to assess resistance of the photochromic adhesives to bleeding during an injection molding process. The top and bottom plates of the press were independently temperature controlled. Both plates were heated to a temperature of 185° C. Two polished steel plates were placed with the polished sides facing each other on the bottom plate of the press and then compressed with 15 tons of pressure for 3 minutes to pre-heat the polished steel plates. Then the following process was used for each set of two MYLAR laminates from Examples 1 and 2 and Comparative Examples 3 and 4. First, the laminates were placed side by side approximately 1 inch (2.5 cm) apart between two 118 micron thick sheets of MYLAR (from Transcendia). The MYLAR sheets with the laminates therebetween were placed between the polished sides of the preheated steel plates. The plates then were placed in the press and compressed for three minutes under 15 tons of pressure. The pressure was released, the steel plates were taken out of the press, and the Mylar sheets with the laminates therebetween were removed. The hot steel plates then were used for the next set of laminates.

The compressed laminates were activated with UV light and then inspected for how much adhesive flowed beyond the edge of the laminate during the heated compression in the hydraulic press. This is referred to as the "bleeding resistance test" herein below. Uneven flows with multiple excursions from the laminate edge with lengths 2 mm constitute a failure that will bleed too much during an injection molding process. Generally even flows, with excursions averaging <2 mm constitutes a passing performance, with bleeding sufficiently restricted for injection molding. The laminates were also visually inspected for their appearance after heated compression. The formation of voids or tearing in the adhesive constitute a failure as well. The results of the inspections for bleeding resistance and appearance are shown in the following Table 7. The appearance failures for Comparative Example 3 were due to small voids or non-spherical bubbles that formed in the bulk of the adhesive during heated compression. For Comparative Example 4, the appearance failures were due to tearing of the adhesive that occurred primarily near the edges of the laminate samples.

TABLE 7

Heated Press Bleeding Test Results on MYLAR laminates.

| Adhesive composition | Bleeding Resistance Pass Rate | Appearance Pass Rate |
|---|---|---|
| Example 1 | 2/2 | 2/2 |
| Example 2 | 2/2 | 2/2 |
| Comparative Example 3 | 0/2 | 0/2 |
| Comparative Example 4 | 2/2 | 0/2 |

The data in Table 6 above illustrate that all the tested photochromic adhesives have a similar activated darkness of 0.76 to 0.79 ΔOD after fifteen minutes of activation. All the tested adhesives also have the same fade speed. This shows that the photochromic adhesive compositions of the present invention comprising poly(anhydride), i.e., photochromic adhesive compositions of Examples 1 and 2, can match the activated darkness and fade speed of photochromic adhesive compositions that do not comprise poly(anhydride), i.e., Comparative Example 3, or photochromic adhesive compositions with added conventional blocked isocyanate cross-linkers, i.e., the composition of Comparative Example 4.

The data in Table 7 above illustrate that adhesive compositions of the present invention comprising poly(anhydride), i.e., the compositions of Examples 1 and 2, provide laminates with passing bleeding resistance and appearance ratings, as compared with the adhesive composition of Comparative Example 3. The composition of Comparative Example 4, which included an added conventional blocked isocyanate crosslinker, provided a laminate with passing bleeding resistance rating, but did not provide a laminate with passing appearance. The adhesive composition of Comparative Example 4 also is not desirable because the use of isocyanates requires additional safety precautions.

The present invention has been described with reference to specific details of particular embodiments thereof. It is not intended that such details be regarded as limitations upon the scope of the invention except insofar as to the extent that they are included in the accompanying claims.

We claim:

1. A photochromic film laminate comprising at least:
   (a) a first polymeric film layer having a first surface and an opposing second surface; and (b) an adhesive layer over at least a portion of and in direct contact with the first surface of the first polymeric film layer (a), said adhesive layer formed from an adhesive composition comprising:
  (i) a thermoplastic polyol having a number average molecular weight greater than or equal to 30,000 g/mol;
  (ii) a poly(anhydride); and
  (iii) a photochromic material,
wherein the thermoplastic polyol (i) is present in the composition in an amount greater than or equal to 60 percent by weight based on total combined weight of solids present in the thermoplastic polyol (i) and the poly(anhydride) (ii).

2. The photochromic laminate of claim 1, further comprising (c) a second polymeric film layer, which is the same or different from the first polymeric film layer (a), the second polymeric film layer having a first surface and an opposing second surface, wherein the first surface of the second polymeric film layer is disposed over and in direct contact with at least a portion of the adhesive layer.

3. The photochromic laminate of claim 1, wherein the first polymeric film layer (a) comprises a polymer selected from the group consisting of polycarbonate, polycyclic alkene, polyurethane, poly(urea)urethane, polythiourethane, polythio(urea)urethane, poly(allyl carbonate), cellulose acetate, cellulose diacetate, cellulose triacetate, cellulose acetate propionate, cellulose acetate butyrate, poly(vinyl acetate), poly(vinyl alcohol), poly(vinyl chloride), poly(vinylidene chloride), poly(ethylene terephthalate), polyester, polysulfone, polyolefin, polyether, polyamide, polyalkyl(meth)acrylate, polyvinyl butyral, copolymers thereof, and mixtures thereof.

4. The photochromic laminate of claim 1, wherein the thermoplastic polyol (i) comprises a thermoplastic polyol selected from the group consisting of a polyurethane polyol, a polyether polyol, a polyester polyol, a polycarbonate polyol, an acrylic polyol, a polydimethylsiloxane polyol, a poly(urea)urethane polyol, a polyamide polyol, copolymers thereof, and mixtures thereof.

5. The photochromic laminate of claim 1, wherein the thermoplastic polyol (i) comprises a thermoplastic polyurethane polyol having a Shore A hardness of less than 90.

6. The photochromic laminate of claim 1, wherein the thermoplastic polyol (i) comprises an aliphatic thermoplastic polyurethane diol.

7. The photochromic laminate of claim 1, wherein the poly(anhydride) (ii) comprises a polymer having an average of at least two cyclic carboxylic acid anhydride groups per molecule.

8. The photochromic laminate of claim 1, wherein the poly(anhydride) (ii) comprises at least one copolymer selected from the group consisting of:
  a copolymer of maleic anhydride and a $C_2$-$C_{24}$ olefin,
  a copolymer of maleic anhydride and (meth)acrylate,
  a copolymer of maleic anhydride and styrene,
  and mixtures thereof.

9. The photochromic laminate of claim 1, wherein the poly(anhydride) (ii) has a number average molecular weight of 500 to 100,000 g/mol.

10. The photochromic laminate of claim 1, wherein the ratio of equivalents of anhydride groups present in the poly(anhydride) (ii) to the equivalents of hydroxyl groups present in the thermoplastic polyol (i) ranges from 1:4 to 20:1.

11. The photochromic laminate of claim 1, wherein the adhesive composition further comprises an acid-reactive material selected from the group consisting of epoxy-functional materials, polycarbodiimides, oxazoline-functional materials, beta-hydroxyl alkylamides, and mixtures thereof.

12. The photochromic laminate of claim 1, wherein the photochromic material (iii) is selected from the group consisting of naphthopyrans, benzopyrans, indenonaphthopyrans, phenanthropyrans, spiropyrans, oxazines, mercury dithiozonates, fulgides, fulgimides, and mixtures thereof.

13. The photochromic laminate of claim 1, wherein the adhesive composition comprises 0.05 to 20 weight percent of the photochromic material, where weight percentages are based on total solids present in the adhesive composition.

14. The photochromic laminate of claim 1, wherein the adhesive composition further comprises 0.1 to 30 weight percent of an acid-reactive material where weight percentages are based on the combined weight of total solids present in the thermoplastic polyol (i), the poly(anhydride) (ii), and the acid-reactive material.

15. The photochromic laminate of claim 1, wherein the first polymeric film layer (a) further comprises at least one additional layer selected from the group consisting of a primer layer, a release film layer, a tie layer, a barrier layer, an adhesion-promoting layer, a UV absorbing layer, and combinations thereof.

16. The photochromic film laminate of claim 1, wherein the thermoplastic polyol (i) is present in the adhesive composition in an amount greater than 70 percent by weight based on total combined weight of solids present in the thermoplastic polyol (i) and the poly(anhydride) (ii).

17. An optical article comprising the photochromic laminate of claim 1.

18. The optical article of claim 17, wherein the optical article is a lens.

19. The photochromic laminate of claim 2, wherein the second polymeric film layer (c) comprises a polymer selected from the group consisting of polycarbonate, polycyclic alkene, polyurethane, poly(urea)urethane, polythiourethane, polythio(urea)urethane, poly(allyl carbonate), cellulose acetate, cellulose diacetate, cellulose triacetate, cellulose acetate propionate, cellulose acetate butyrate, poly(vinyl acetate), poly(vinyl alcohol), poly(vinyl chloride), poly(vinylidene chloride), poly(ethylene terephthalate), polyester, polysulfone, polyolefin, polyether, polyamide, polyalkyl(meth)acrylate, polyvinyl butyral, copolymers thereof, and mixtures thereof.

20. The photochromic laminate of claim 2, wherein the second polymeric film layer (c) further comprises at least one additional layer selected from the group consisting of a primer layer, a release film layer, a tie layer, a barrier layer, an adhesion-promoting layer, a UV absorbing layer, and combinations thereof.

* * * * *